United States Patent [19]

Butcher et al.

[11] 4,088,831
[45] May 9, 1978

[54] SYNCHRONIZATION FOR PCM TRANSMISSION SYSTEMS

[75] Inventors: John A. W. Butcher, Stansted; Edward H. Lambourn, Enfield, both of England

[73] Assignee: International Standard Electric Corporation, New York, N.Y.

[21] Appl. No.: 688,499

[22] Filed: May 20, 1976

[30] Foreign Application Priority Data

Jul. 3, 1975 United Kingdom ............... 28022/75

[51] Int. Cl.² ............................................ H04L 7/00
[52] U.S. Cl. ............................ 178/69.1; 179/15 BS; 325/38 R; 325/320; 178/68
[58] Field of Search ............ 178/69.1, 68; 325/38 R, 325/143, 38 A, 38 B, 320; 360/44, 51; 179/15 BS, 15 BY; 328/119

[56] References Cited

U.S. PATENT DOCUMENTS

| 3,020,483 | 2/1962 | Losee | 179/15 BS |
|---|---|---|---|
| 3,238,299 | 3/1966 | Lender | 325/38 A |
| 3,500,247 | 3/1970 | Sekimoto | 325/38 R |
| 3,629,728 | 12/1971 | Whitlow | 178/69.1 |
| 3,646,451 | 2/1972 | Shoap | 178/69.1 |
| 3,729,678 | 4/1973 | Glasbergen | 325/38 B |
| 3,755,748 | 8/1973 | Carlow | 178/69.1 |

Primary Examiner—Benedict V. Safourek
Assistant Examiner—Michael A. Masinick
Attorney, Agent, or Firm—John T. O'Halloran; Alfred C. Hill

[57] ABSTRACT

At the transmitter the synchronization information is provided by position modulation of the line transitions of at least one bit of a PCM word. The receiver is synchronized to the received coded signal by detecting the position modulation of the bit of the PCM word. This arrangement avoids the need for extra bits to convey synchronization information.

20 Claims, 9 Drawing Figures

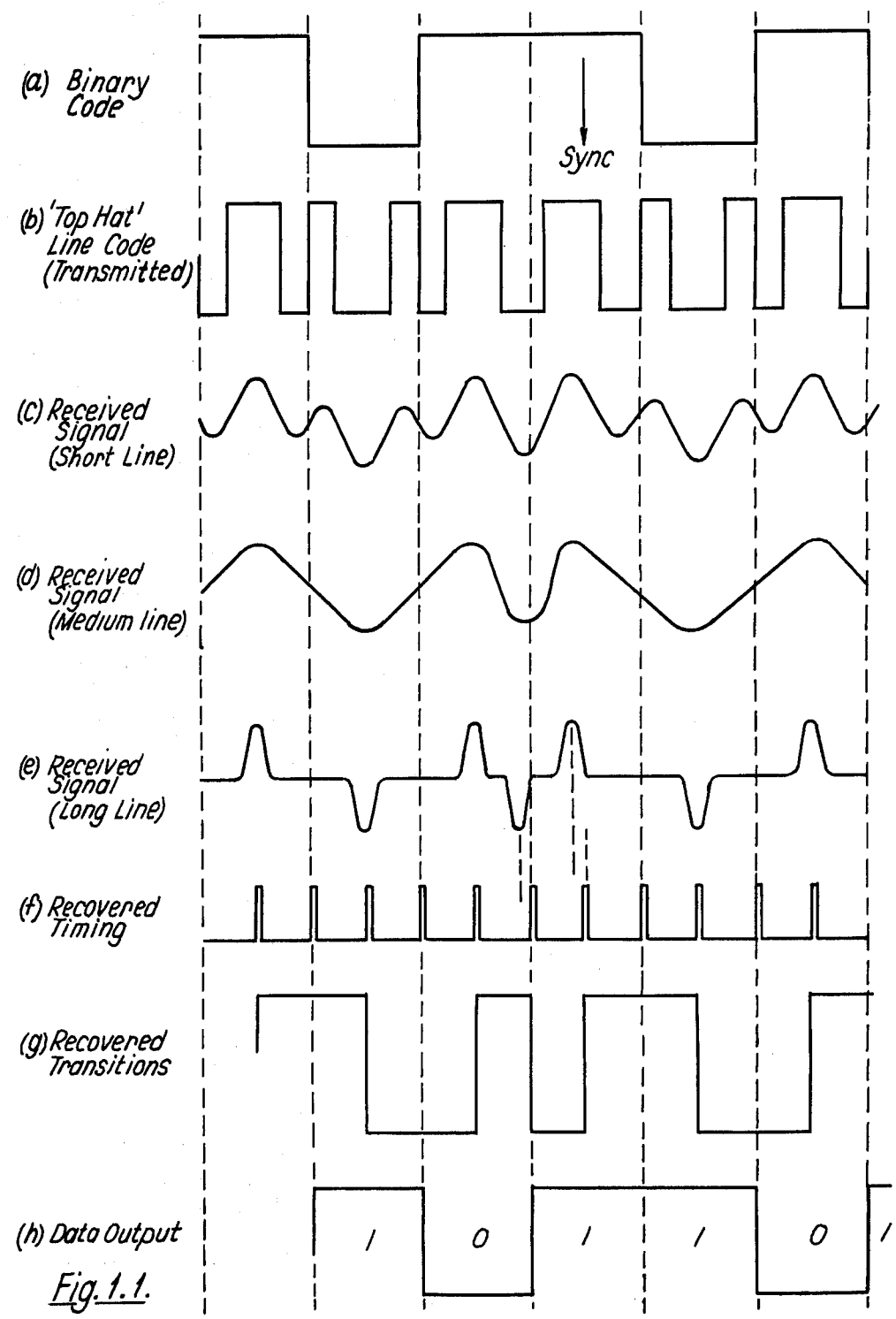
Fig.1.1.

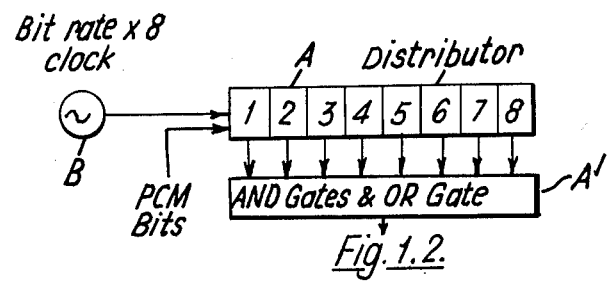
Fig. 1.2.
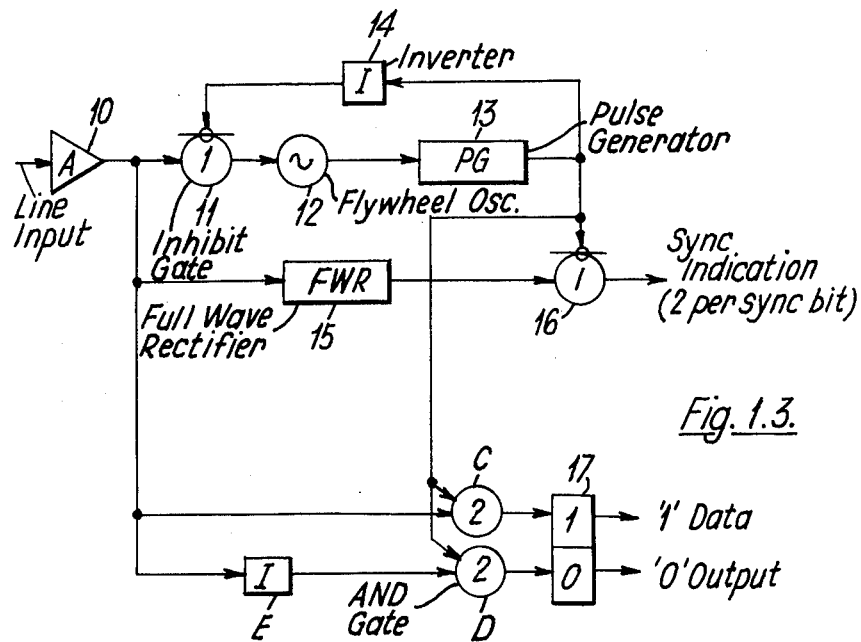
Fig. 1.3.

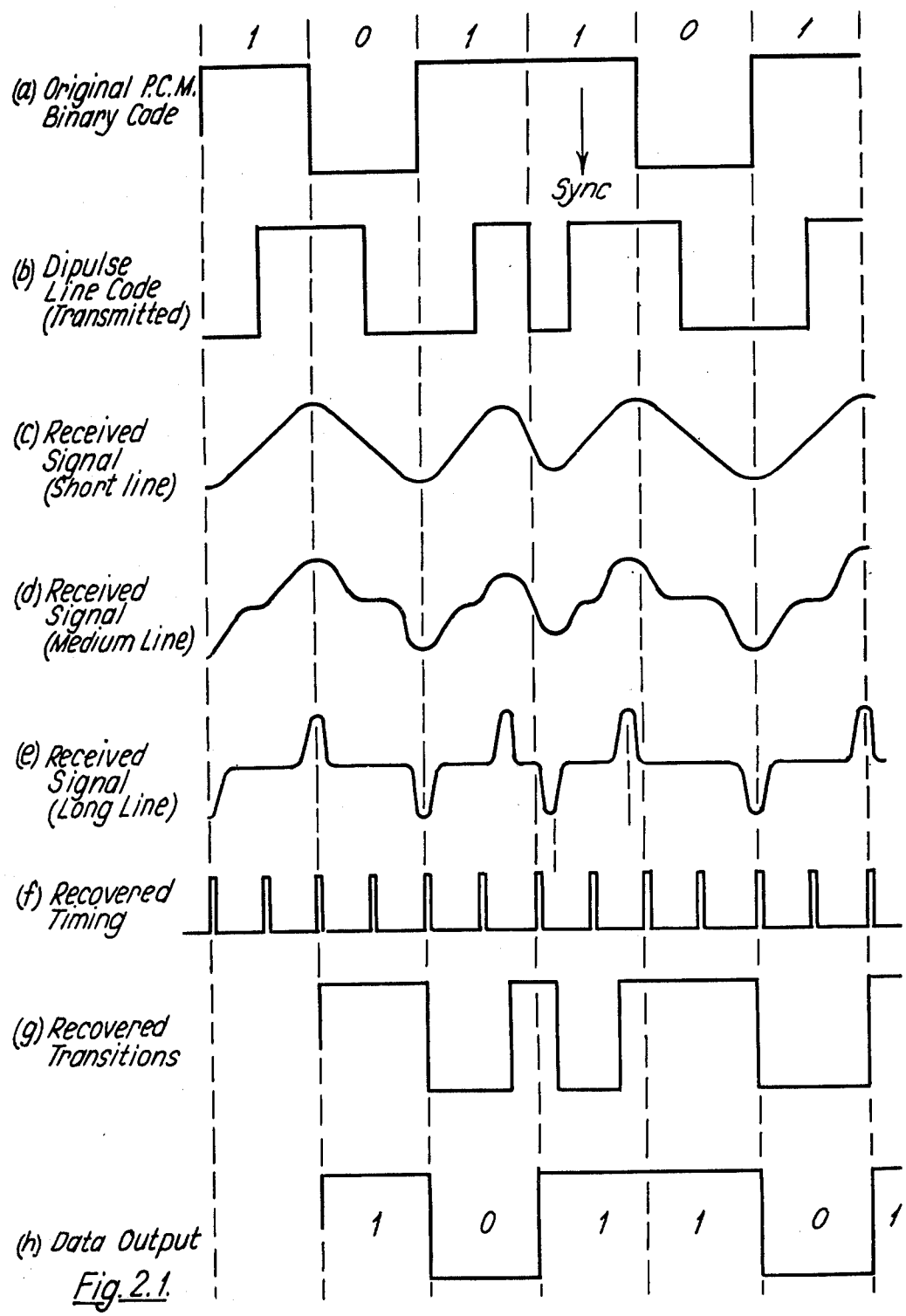
Fig. 2.1.

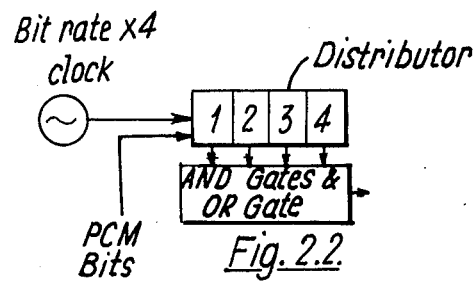
Fig. 2.2.
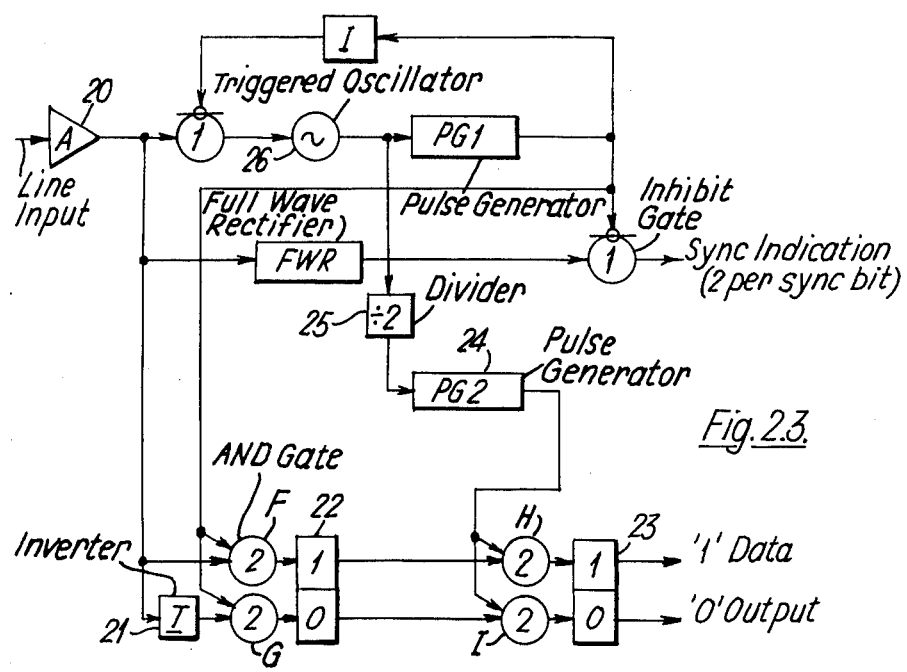
Fig. 2.3.

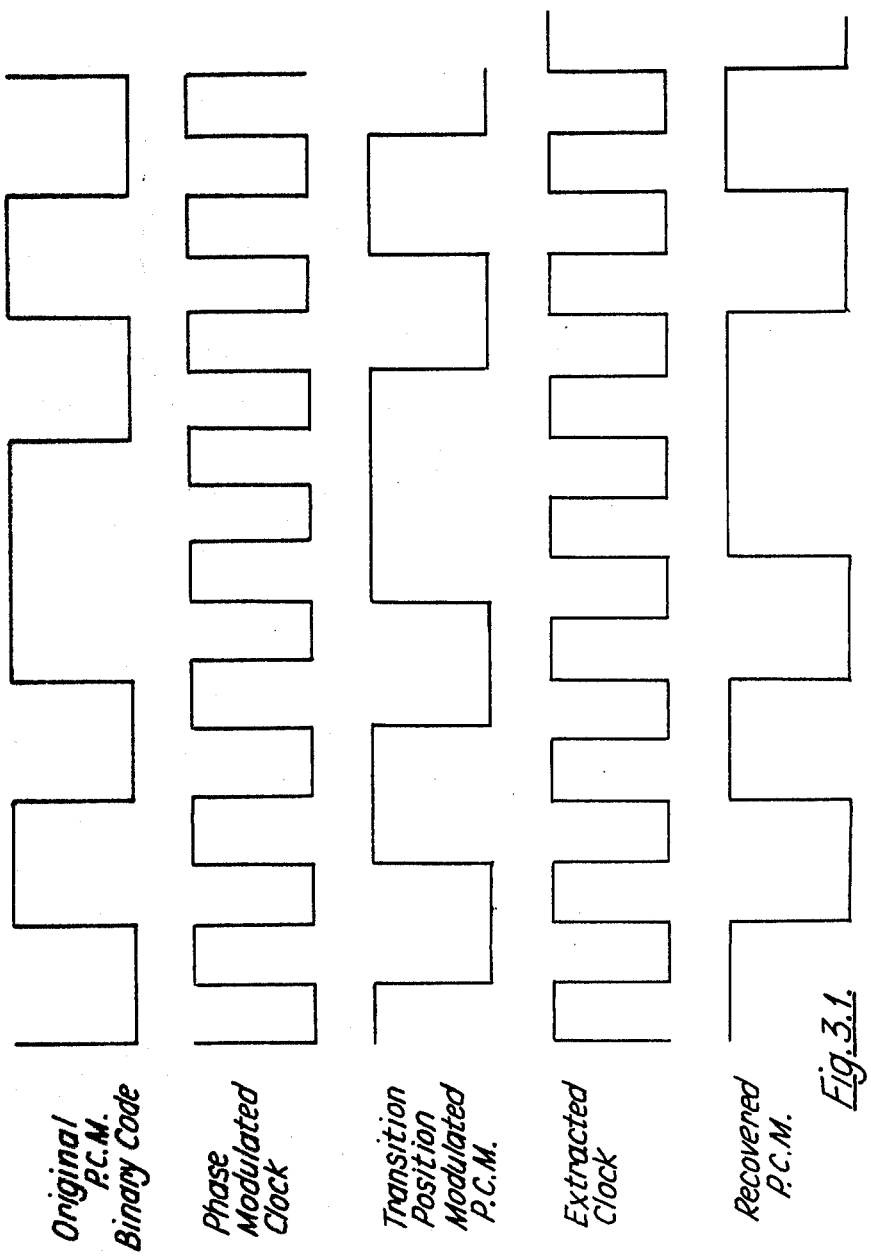
Fig. 3.1.

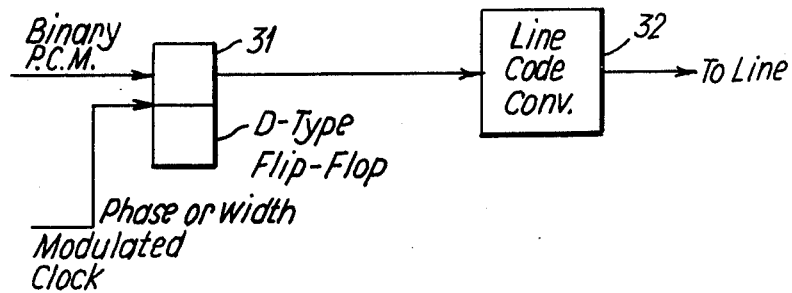
Fig. 3.2.
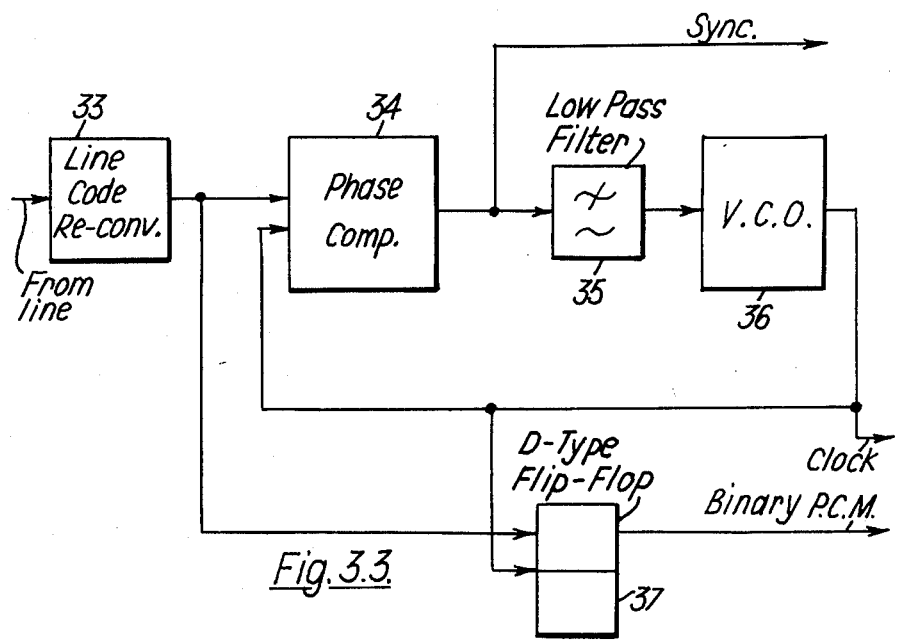
Fig. 3.3.

SYNCHRONIZATION FOR PCM TRANSMISSION SYSTEMS

BACKGROUND OF THE INVENTION

This invention relates to pulse code modulation (PCM) systems of communication.

With the advent of integrated circuit techniques it is now possible to make extremely compact PCM codecs (coder/decoders). Indeed a single channel codec can be incorporated in a conventional telephone instrument if desired, thus enabling the construction of an all-digital telephone system. Such a system may be used as a normal voice communication system or, with suitable adaptors, the telephone instruments may be used as data terminal devices.

SUMMARY OF THE INVENTION

An object of the present invention is to provide an improved PCM communication system.

A feature of the present invention is the provision of a pulse code modulation (PCM) system comprising: a transmitter including an input for binary bits of a PCM signal; and first means coupled to the input for introducing a position modulation of at least one line code transition to transmit information in a line code signal having a given bit rate; and a receiver including second means coupled to the first means to derive from the line code signal a clock having a specified relationship to the given bit rate; third means coupled to the first means to full wave rectify the line code signal; first gating means coupled to the second and third means responsive to the derived clock and said rectified signal to recreate the line code transition position modulation; second gating means coupled to the first means and the second means to produce an output signal dependent on the relationship between the line code signal and the derived clock; bistable means coupled to the second gating means responsive to the output signal to recreate the binary bits of the PCM signal at the input.

Another feature of the present invention is the provision of a pulse code modulation (PCM) transmitter comprising an input for binary bits of a PCM signal; and first means coupled to the input for introducing a position modulation of at least one line code transition to transmit information in a line code signal.

Still another feature of the present invention is the provision of a pulse code modulation (PCM) receiver for a line code signal having at least one line code transition position modulated to convey information in a line code signal having a given bit rate comprising: first means to receive the line code signal; and second means coupled to the first means for demodulating the line code transition position modulation.

Position modulation of line code transitions in a PCM system can be used for conveying data, or signalling or synchronizing information in relation to the PCM signals without the need for extra PCM bits. The PCM information and the information carried by the position modulated transitions can be separately decoded from the same pulse train without mutual interference.

BRIEF DESCRIPTION OF THE DRAWING

Above-mentioned and other features and objects of this invention will become more apparent by reference to the following description taken in conjunction with the accompanying drawing, in which:

FIG. 1.1 is a timing diagram illustrating the application of position modulation of line code transitions to a "Top-Hat" code for synchronization purposes in accordance with the principles of the present invention;

FIG. 1.2 is a block diagram of circuitry necessary at the transmitter of the system to position modulate the line transitions of a Top-Hat code in accordance with the present invention;

FIG. 1.3 is a block diagram at the receiver of the system of the circuitry necessary for detecting the position modulation of a "Top-Hat" code in accordance with the principles of the present invention;

FIG. 2.1 is a timing diagram illustrating the application of position modulation of line code transitions to a dipulse code for synchronization purposes in accordance with the principles of the present invention;

FIG. 2.2 is a block diagram of circuitry necessary at the transmitter of the system to position modulate the line code transitions of a dipulse code in accordance with the principles of the present invention;

FIG. 2.3 is a block diagram at the receiver of the system of the circuitry necessary for detecting the position modulatin of a dipulse code in accordance with the principles of the present application;

FIG. 3.1 is a timing diagram illustrating the application of position modulation of line code transitions of a conventional PCM code for synchronization purposes in accordance with the principles of the present invention;

FIG. 3.2 is a block diagram at the transmitter of the system of the circuitry necessary to position modulate the line code transitions of a conventional PCM code in accordance with the principles of the present invention; and FIG. 3.3 is a block diagram at the receiver of the system of the circuitry necessary for detecting the position modulation of a conventional binary code in accordance with the principles of the present invention.

DESCRIPTION OF THE PREFERRED EMBODIMENTS

FIG. 1.1 shows the application of position modulation of line code transitions to a so-called "Top-Hat" line code for synchronization purposes. The Top Hat line code is also known as the Wal 2 code and is described in "A Comparison of Modulation Systems For Data Transmission Over Physical Pairs In A Synchronous Digital Data Network", by R. A. Boulter and R. J. Westcott, I.E.E.E. International Symposium - Subscribers Loops and Services, 20th – 23rd May 1974, Ottawa, Canada.

Curve (a) of FIG. 1.1 shows the binary code to be transmitted and an arbitrary selection is made that the fourth digit of this code is to be the synchronization indicator bit. The corresponding Top Hat line code to be transmitted is shown in Curve (b) of FIG. 1.1. It will be noted that the transitions on the fourth digit are perturbed to the extent that they are advanced with respect to their normal times of occurrence. Curves (c), (d) and (e) of FIG. 1.1, show the received signal conditions related to short length, medium length, and long length transmission circuits. The latter, Curve (e) of FIG. 1.1, is in practice the most usual situation.

In the receiving circuit, the first operation is to recover the initial timing (bit synchronization). Since the received wave form is rich in transients, these can be used to trigger an oscillator in the normal way. It will, however, be noted that two of these transients, at the end of the third, and during the fourth bit, are displaced in time with respect to the cycle or half cycle times of the other transients. By suitably adjusting the "Q factor" of the oscillator to be triggered by these transients, the oscillator can be made to run in sympathy with the majority of the transients, and be virtually non responsive to the misplaced, perturbed transients. This approach can be further enhanced by incorporating an inhibit gate on the triggering input of the oscillator so that the perturbed transients are inhibited form triggering the oscillator. This technique will be described later.

Further, the non-coincidence of the transients and the recovered timing pulses for a specific bit will be used to indicate the occurence of a synchronization indication, and a suitable output to this effect can be produced. Again this will be described later.

Apart from the modified timing recovery circuit, the data regeneration circuits at the receiving end are effectively the standard arrangements for Top-Hat reception. Curve (g), FIG. 1.1 shows the recovered waveform transitions, and when these are strobed with the bit clock of Curve (f) of FIG. 1.1, the data output waveform of Curve (h), FIG. 1.1 results.

Consider now, in more detail, the means by which synchronization is indicated at the initial line code wave-form and is subsequently detected at the receiving end.

For Top-Hat line encoding, it is necessary to have quarter bit periods defined at the transmitting end (i.e. four times bit frequency). The line encoding across one bit period will then encode the bit to be transmitted as either sub-periods 1 and 4 negative and sub-periods 2 and 3 positive, or vice versa, depending on whether a binary "1" or "0" is to be transmitted to line.

FIG. 1.2 shows how position modulation can be applied to a Top-Hat code. An eight stage distributor A in the form of a shift register, for example, is driven by a clock B running at 8 times the line code bit rate and also receives the PCM bits. For normal line code modulation the distributor outputs are selected by logic AND gates and an OR gate A' as follows:

| "1" | $\bar{1}\bar{2}345\bar{6}\bar{7}\bar{8}$ |
|-----|-----|
| "0" | $12\bar{3}\bar{4}\bar{5}\bar{6}78$ |

When it is desired to position modulate the line code transitions for signalling purposes the distributor outputs in respect to one bit are selected logic AND gates and OR gate A', where this OR gate is the same OR gate used in the normal line code modulation as follows:

| "1" | $\bar{1}\bar{2}\bar{3}45\bar{6}\bar{7}8$ |
|-----|-----|
| "0" | $\bar{1}2\bar{3}\bar{4}\bar{5}\bar{6}78$ |

In other words, instead of using ¼-bit periods for generating the line pulses ⅛-bit periods are employed. The normal bits to be encoded each occupy a segment of 2/8ths of a bit period. For the bit or element on which the synchronization point is to be indicated, the transiton which would normally occur at the ¼ and ¾ bit periods are now constrained to occur at the ⅜ and ⅝ bit periods instead. This is in effect adding a 12½% (telegraph) distortion to the bit stream. It is convenient to use ⅛ bit pulses for this operation, but a specific solution is not necessarily constrained to this particular further subdivision of the bit timing. Further, transition could be delayed rather than advanced.

FIG. 1.3 indicates in schematic form the operations required for reading and interpreting the received line signals at the remote end. After passing through the line terminating amplifier 10 the received line pulses pass through an inhibit gate 11 to trigger a fly wheel oscillator 12 running at twice the bit frequency. This oscillator drives a pulse generator 13 which produces the basic recovered timing waveform. By adjusting the effective "Q" of oscillator 12, it is driven in sympathy with the majority of the incoming pulses from the line, and is relatively unaffected by the occurrence, once per synchronizing period, of two pulses which are relatively out of phase with the remainder, due to the induced position modulation imposed at the transmitting end. Further, to ensure that these out of phase transients have no effect upon oscillator 12 when the system is running, inhibit gate 11 is placed between the line terminating amplifier 10 and the triggered oscillator 12. This gate 11 is inhibited by the output of the recovered timing pulse generator 13 which is passed through inverter 14. Thus, once the system is in operation, the out of phase received pulses from the line cannot get through to the triggered oscillator 12 to constrain its cyclic operation (i.e. there is no pulling).

Two further outputs are taken from the line terminating amplifier 10. The first is passed through a full wave rectifier 15 to give line pulses all the same polarity for each transition condition in the line coding which reaches the line terminating amplifier 10, irrespective of whether this happened to be an encoded "1" or "0". The output of the full wave rectifier circuit 15 is gated in an inhibit gate 16 by the output of the recovered timing pulse generator 13. It will be appreciated that gate 16 is inhibited only when the line transients detected correspond in time with the recovered timing pulses. Thus, in the case of the information bit which also carried the synchronization indication, the line transitions will not correspond with the recovered timing and in this case the inhibit gate 16 will emit two pulses, corresponding to the distorted line transitions, at the time of occurrence of the synchronizing indication imposed upon the chosen information bit.

The other output from the line terminating amplifier 10 is coupled to the circuit elements that recover the transmitted data. Thus, a flip flop 17 is gated by the output of AND gates C and D which are gated by the recovering timing pulses in a conventional manner to pass the output of the line terminating amplifier 10 to one input of flip flop 17, and the inverted output of the line terminating amplifier 10 provided by inverter E on the other input of flip flop 17 to produce the final data output in the form of a binary stream.

In the case of dipulse line encoding a similar technique applies. A dipulse code is in effect one in which each bit period is divided into two havles which are modulated in opposite senses, the sequence of these senses indicating whether the bit is a "0" or a "1". It is a form of phase modulation. Curve (a) of FIG. 2.1 shows the binary code to be transmitted and the remainder of FIG. 2.1 shows the relevant waveforms corresponding to those of FIG. 1.1.

However, as will be seen from FIG. 2.2, for position modulation the bit period is now required to be divided by 4 rather than 8 as previously. Nevertheless the principle of operation at the transmitting end remains the same but in the case of dipulse line encoding, the transmission distortion introduced is 25%, rather than 12½%.

For normal line code modulation the distributor outputs are selected by AND gates and an OR gate as follows:

| "1" | $\bar{1}\bar{2}34$ |
|---|---|
| "0" | $12\bar{3}\bar{4}$ |

When it is desired to position modulate the line code transitions for signalling purposes the distributor outputs in respect of one bit are selected by AND gates and an OR gate as follows:

| "1" | $\bar{1}23\bar{4}$ |
|---|---|
| "0" | $1\bar{2}\bar{3}4$ |

In other words, instead of using ½-bit periods for generating the line pulses ¼-bit periods are employed. The normal bits to be encoded each occupy a segment of 2/4 of a bit period. For the bit or element on which the synchronization point is to be indicated the transition which would normally occur at the ½-bit period is now constrained to occur at the ¼-bit period instead. It is convenient to use ¼-bit pulses for this operation, but a specific solution is not necessarily constrained to this particular further sub-division of the line code bit timing. Again, the transition could be delayed rather than advanced.

In the case of dipulse line encoding, the recovery of information at the receiving end is slightly different from the arrangement for Top Hat encoding. The recovery of the basic timing together with the inhibition applied to the triggered oscillator, and the recovery of the sync indication is as before. The differences are in the recovery of the binary data stream that was transmitted. For illustrative purposes, one method of recovering this information is shown in FIG. 2.3.

In this particular arrangement, after amplification in the line terminal amplifier 20, the pulses received from line are fed direct and via inverter 21 to the "1" and "0" sides of a flip flop 22 gated by AND gates F and G. The operation of flip flop 23 is controlled by the recovered timing pulses at twice the bit frequency. The outputs of this flip flop 22 drive a second flip flop 23 gated by AND gates H and I. The operation of this second flip flop 23 is determined by recovered timing running at the bit rate, and derived by means of a pulse generator 24 and divide by two in divider circuit 25 fed from the triggered oscillator 26 running at twice the bit frequency. The output of this second flip flop 23 gives the recovered binary data stream.

FIG. 3.1 shows a straightforward binary code to be transmitted before conversion to a special line code. In this case the position modulation of the code transitions can be accomplished very simply by the use of a single D-type bistable of flip flop, that is a bistable which has only one conditioning input, the D or data input, and whatever information is present at this input propagates to the "1" output when the leading edge of an applied clock pulse occurs. Such an arrangement is shown in FIG. 3.2. The original PCM binary code is applied to D-type bistable 31 together with a phase modulated clock. The output of the bistable is the transition position modulated PCM of FIG. 3.1, which can then be applied to a well known and conventional asynchronous line code converter 32. As an alternative to a phase modulated clock use may be made of a pulse width modulated clock. In either case the modulation of the clock pulse edges must not exceed the bounds of one clock pulse otherwise errors will be introduced into the PCM.

At the receiver, FIG. 3.3, the incoming signals are first reconverted asynchronously from the line code to binary coded PCM in a well known and conventional converter 33. A phase locked loop is used for extracting a so called "clean" clock from the incoming PCM. This loop consists of a phase comparator 34 to which the PCM is applied, a low pass filter 35 to which the output of the comparator is applied, and a voltage controlled oscillator 36 to which the filter output is applied as the control voltage. A feedback connection from the oscillator output provides the other input to the phase comparator 34 and this completes the loop. The loop is designed so that short term variations in the timing of the incoming PCM do not disturb the stability of the oscillator which then produces the "clean" clock. The clock together with the incoming PCM are then applied to the D-type flip flop 37 which regenerates the PCM in the normal way. The output of phase comparator 34 also provides effectively the separated synchronizing signal.

While the invention has been described in terms of providing a channel for data, signalling or synchronizing information in a PCM system, it has also been found to provide an acceptable, if low grade, speech channel superimposed on a high speed high grade music PCM system.

While we have described above the principles of our invention in connection with specific apparatus it is to be clearly understood that this description is made only by way of example and not as a limitation to the scope of our invention as set forth in the objects thereof and in the accompanying claims.

We claim:

1. A pulse code modulation (PCM) system comprising:
   a transmitter including
      an input for binary bits of a PCM signal; and first means coupled to said input for introducing a position modulation of at least one line code transition to transmit information in a line code signal having a given bit rate; and
   a receiver including
      second means coupled to said first means to derive from said line code signal a clock having a specified relationship to said given bit rate;
      third means coupled to said first means to full wave rectify said line code signal;
      first gating means coupled to said second and third means responsive to said derived clock and said rectified signal to recreate said line code transition position modulation;
      second gating means coupled to said first means and said second means to produce an output signal dependent on the relationship between said line code signal and said derived clock;
      bistable means coupled to said second gating means responsive to said output signal to recreate said binary bits of said PCM signal at said input.

2. A system according to claim 1, wherein said information transmitted by said position modulation of said one of said line code transition is synchronization information.

3. A system according to claim 2, wherein
said first means includes
an N-stage distributor coupled to said input, where N is an integer greater than one;
fourth means coupled to said distributor for selecting the outputs of said distributor to provide line code bits having normal transition positions with respect to a period of said line code bits and the outputs of said distributor to provide said line code bits each having said position modulation of at least one transition with respect to the normal time of occurrence of said one transition, and
clock means operating at N times said given bit rate coupled to said distributor to control said distributor.

4. A system according to claim 2, wherein
said first means includes
a D-type flip flop having a data input coupled to said input for said PCM signal and a clock input receiving a modulated clock pulse having a bit rate equal to the bit rate of said PCM signal.

5. A system according to claim 4, wherein
said modulated clock pulse is phase modulated.

6. A system according to claim 4, wherein
said modulated clock pulse is pulse width modulated.

7. A pulse code modulation (PCM) system comprising:
a transmitter including
input means for binary bits of a PCM signal; and
N-stage distributor means coupled to said input means for introducing a position modulation of at least one of said binary bits without the addition of additional bits to said PCM signal to transmit an information signal having a given bit rate, where N is greater than one; and
a receiver including
a phase locked loop having
a phase comparator coupled to said distributor means,
a low pass filter coupled to the output of said phase comparator, and
a voltage controlled oscillator having its input coupled to the output of said filter and its output coupled to said phase comparator as a second input thereto;
said position modulation being produced at the output of said phase comparator.

8. A system according to claim 7, wherein
said information transmitted by said position modulation of said one of said binary bits is synchronization information.

9. A pulse code modulation (PCM) transmitter comprising:
an input for binary bits of a PCM signal; and
first means coupled to said input for introducing a position modulation of at least one line code transition to transmit synchronization information in a line code signal, wherein;
said first means includes
an N-stage distributor coupled to said input, where N is an integer greater than one,
second means coupled to said distributor for selecting the outputs of said distributor to provide line code bits having normal transition positions with respect to a period of said line code bits and the outputs of said distributor to provide said line code bits each having said position modulation of at least one transition with respect to the normal time of occurrence of said one transition, such that additional bits are not added to said line code, and
clock means operating at N times said given bit rate coupled to said distributor to control said distributor.

10. A transmitter according to claim 9 wherein said first means includes
a D-type flip flop having a data input coupled to said input for said PCM signal and a clock input receiving a modulated clock pulse having a bit rate equal to the bit rate of said PCM signal.

11. A transmitter according to claim 10, wherein
said modulated clock pulse is phase modulated.

12. A transmitter according to claim 10, wherein
said modulated clock pulse is pulse width modulated.

13. A pulse code modulation (PCM) receiver for a line code signal having at least one line code transition position modulated to convey information in a line code signal having a given bit rate comprising:
first means to receive said line code signal;
second means coupled to said first means to derive from said line code signal a clock having a specified relationship to said given bit rate;
third means coupled to said first means to full wave rectify said line code signal;
first gating means coupled to said second and third means responsive to said derived clock and said rectified signal to recreate said line code transition position modulation;
second gating means coupled to said first means and said second means to produce an output signal dependent on the relationship between said line code signal and said derived clock;
bistable means coupled to said second gating means responsive to said output signal to recreate binary bits of an original PCM signal at a transmitter.

14. A receiver according to claim 13, wherein
said information transmitted by said position modulation of said one of said line code transition is synchronization information.

15. A pulse code modulation (PCM) system comprising:
a transmitter including
an input for binary bits of a PCM signal; and
first means coupled to said input for introducing a position modulation of at least one line code transition to transmit synchronization information in a line code signal having a given bit rate; and
a receiver including
second means coupled to said first means for demodulating said line code transition position modulation; wherein said first means includes
an N-Stage distrubutor coupled to said input, where N is equal to an integer greater than one.
third means coupled to said distributor for selecting the outputs of said distributor to provide line code bits having normal transition positions with respect to a period of said line code bits and the outputs of said distributor to provide said line code bits each having said position modulation of at least one transition with respect to the normal time of occurrence of said one transition, such that additional bits are not added to said line code and clock means operating at N times said given bit rate coupled to said distributor to control said distributor.

16. A system according to claim 15 wherein said first means includes
a D-type flip flop having a data input coupled to said input for said PCM signal and a clock input receiving a modulated clock pulse having a bit rate equal to the bit rate of said PCM signal.

17. A system according to claim 16, wherein said modulated clock pulse is phase modulated.

18. A system according to claim 16, wherein said modulated clock pulse is pulse width modulated.

19. A pulse code modulation (PCM) system comprising:
a transmitter including
an input for binary bits of a PCM signal; and
first means coupled to said input for introducing a position modulation of at least one line code transition to transmit synchronization information in a line code signal having a given bit rate; and
a receiver including
second means coupled to said first means for demodulating said line code transition position modulation, said second means including:
a third means coupled to said first means to derive from said line code signal a clock having a specified relationship to said given bit rate;
fourth means coupled to said first means to full wave rectify said line code signal;
first gating means coupled to said third and fourth means responsive to said derived clock and said rectified signal to recreate said line code transition position modulation;
second gating means coupled to said first means and said third means to produce an output signal dependent upon the relationship between said line code signal and said derived clock; and
bistable means coupled to said second gating means responsive to said output signal to recreate said binary bits of said PCM signal at said input.

20. A pulse code modulation (PCM) receiver for a line code signal having at least one line code transition position modulated to convey synchronization information in a line code signal having a given bit rate comprising:
first means to receive said line code signal; and
second means coupled to said first means for demodulating said line code transition position modulation, said second means including:
a third means coupled to said first means to derive from said line code signal a clock having a specified relationship to said given bit rate;
fourth means coupled to said first means to full wave rectify said line code signal;
first gating means coupled to said third and fourth means responsive to said derived clock and said rectified signal to recreate said line code transition position modulation;
second gating means coupled to said first means and said third means to produce an output signal dependent upon the relationship between said line code signal and said derived clock; and
bistable means coupled to said second gating means responsive to said output signal to recreate said binary bits of said PCM signal at said input.

* * * * *